(12) United States Patent
Dahlin et al.

(10) Patent No.: US 6,382,272 B1
(45) Date of Patent: May 7, 2002

(54) LOCOMOTIVE SERVICING VEHICLE

(75) Inventors: William G. Dahlin; William S. Pladson, both of Fargo, ND (US)

(73) Assignee: M-Bar-D Railcar Tech, Inc., Fargo, ND (US)

( * ) Notice: Subject to any disclaimer, the term of this patent is extended or adjusted under 35 U.S.C. 154(b) by 0 days.

(21) Appl. No.: 09/798,091

(22) Filed: Mar. 5, 2001

(51) Int. Cl.[7] .................................................. B65B 1/04
(52) U.S. Cl. ......................... 141/231; 141/98; 141/65; 222/608; 137/351; 280/839
(58) Field of Search ................... 141/231, 232, 141/233, 98, 65, 67, 59; 222/608, 626; 137/351, 355.12; 280/837–839

(56) References Cited

U.S. PATENT DOCUMENTS

| | | |
|---|---|---|
| 2,498,229 A | 2/1950 | Adler |
| 3,032,079 A | 5/1962 | Lisciani |
| 3,814,148 A | 6/1974 | Wostl |
| 5,873,498 A | 2/1999 | Moore et al. |
| 6,176,279 B1 | 1/2001 | Dahlin et al. |

*Primary Examiner*—Steven O. Douglas

(57) ABSTRACT

A motor truck has a frame supporting an enclosed housing having two compartments accommodating a fuel tank, an oil tank in one compartment and a container for sand in the other compartment for servicing a rail locomotive located at a remote location or rail yard. Pumps mounted located in the one compartment move the fuel, oil, and water from the tanks through hoses to tanks on the locomotive. Air flowing from an air compressor moves sand from the sand container into a sand hopper on the locomotive.

20 Claims, 4 Drawing Sheets

LOCOMOTIVE SERVICING VEHICLE

FIELD OF THE INVENTION

The invention is in the field of mobile equipment for servicing rail locomotives with fuel, sand, oil, and water. The mobile equipment comprises a motor vehicle or truck having fuel, water, oil, and sand accommodating tanks and pumps to transport fuel, water, and oil to a locomotive at a remote location or rail yard.

BACKGROUND OF THE INVENTION

Railroad locomotives have large diesel engines that utilize substantial amount of diesel fuel, oil, and water. Sand is also used to improve the traction of the drive wheels of the locomotive on the tracks. When a locomotive requires fuel, it is common practice to cut the locomotive from the train cars and run it to a service pit. This takes time and increases the cost of rail services. The locomotive fuel vehicle of the invention provides all of the essential fuel, water, oil, and sand requirements for a locomotive without the need to cut and run the locomotive to a service pit.

SUMMARY OF THE INVENTION

The invention is an apparatus for servicing a railroad locomotive with fuel, oil, water, and sand with efficient, safe and cost-effective mobile equipment. The locomotive can be serviced in remote locations or in the yard without the need to cut and run the locomotive to a service pit. The apparatus of servicing a locomotive saves time, labor, and cost of railroad services.

The mobile equipment comprises a motor truck or lorry having a frame supporting a housing having a compartment containing tanks for storing diesel fuel, oil, water, and another compartment have a container storing sand and an air compressor for generating a supply of air used to move sand from the container to the sand hopper of a locomotive. Pumps mounted on the truck transfer fuel, oil, and water from the tanks to transfer hoses that carry the fuel, oil, and water to the locomotive. The controls for the pumps include ON-OFF valves and meters that measure the amount of fuel dispensed to the locomotive. Air under pressure from the air compressor carries sand through a hose to the sand hopper on the locomotive. Fuel and oil spill response equipment on the truck is used to clean the environment in the event that there is a fuel or oil spill. The locomotive has a sewage water holding tank. A sewage tank within the housing is connected to a pump used to pump sewage waste from the holding tank into the sewage tank.

DETAILED DESCRIPTION OF THE INVENTION

Figure 1:
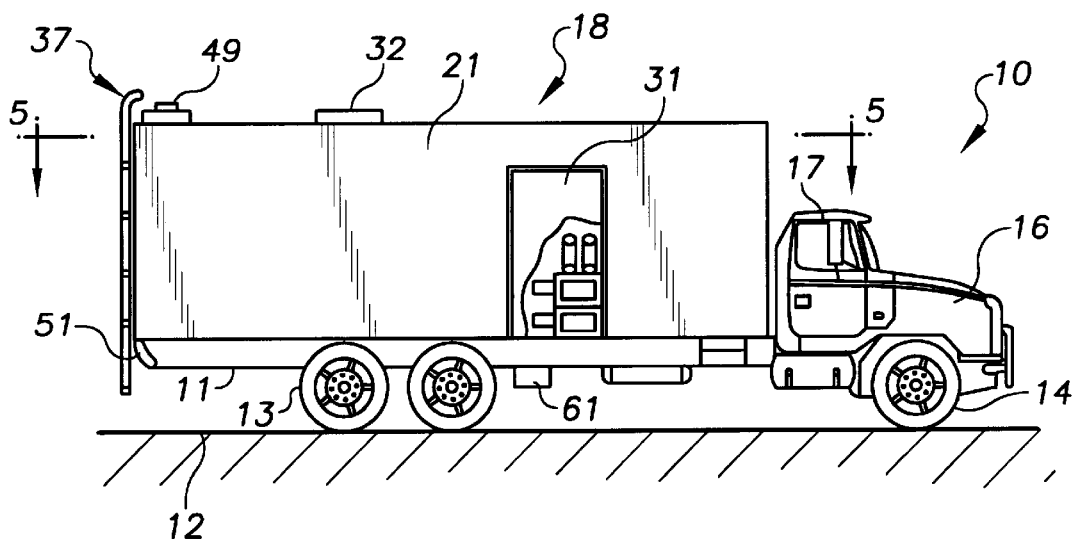
FIG. 1 is a side elevational view of a truck having a housing enclosing water, oil, sand and sewer waste tanks, pumps, an air compressor, and hoses.
Figure 2:
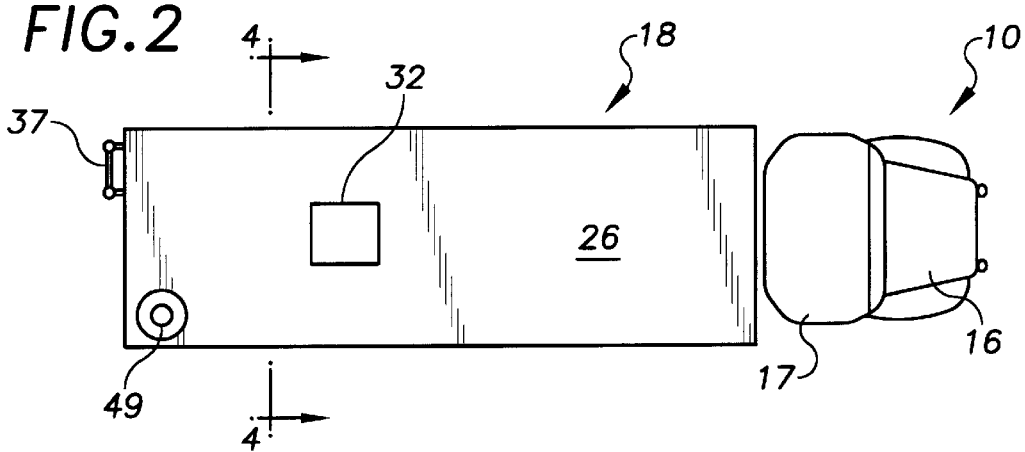
FIG. 2 is a top plan view of FIG. 1.
Figure 3:
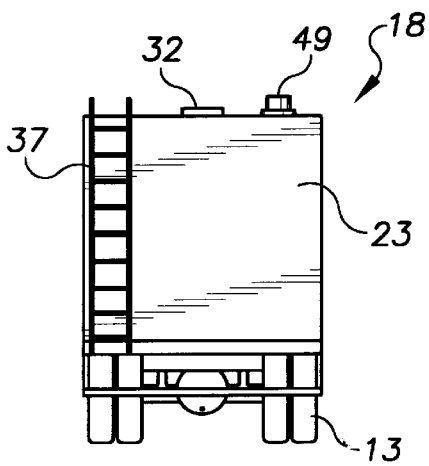
FIG. 3 is a rear elevational view of FIG. 1.
Figure 4:
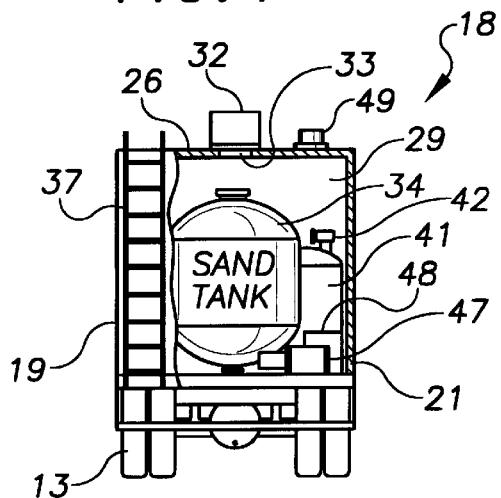
FIG. 4 is a rear elevational view, partly sectioned, of FIG. 1.

A rail locomotive service truck 10, shown in FIGS. 1 and 2, is a one stop service motor vehicle for providing fuel, oil, water, and sand to and removing waste product from a rail locomotive located in a remote location or rail yard in a safe and environmentally effective manner. The locomotive is provided with operating products without the need to cut and run to a locomotive service pit. The cut and run practice is costly and time consuming. Truck 10 has a horizontal frame 11 supported on a roadway or ground 12 with dual drive wheels 13 and front steering wheels 14. The internal combustion engine of truck 10 is mounted on frame 11 under hood 16 in front of drivers cab 17. Frame 11, cab 17, engine, power transmission to drive wheels 13 and steering wheels 14 are conventional motor vehicle structures.

An enclosed box or housing 18 mounted on frame 11 behind cab 17 has side walls 19 and 21, and a front wall 22 and rear end wall 23 joined to a horizontal floor 24. The top of the housing 18 is closed with a roof 26 secured to upright walls 19, 21, 22 and 23. Windows can be included in the side walls. The truck, alternatively, can be a tractor trailer vehicle.

Figure 5:
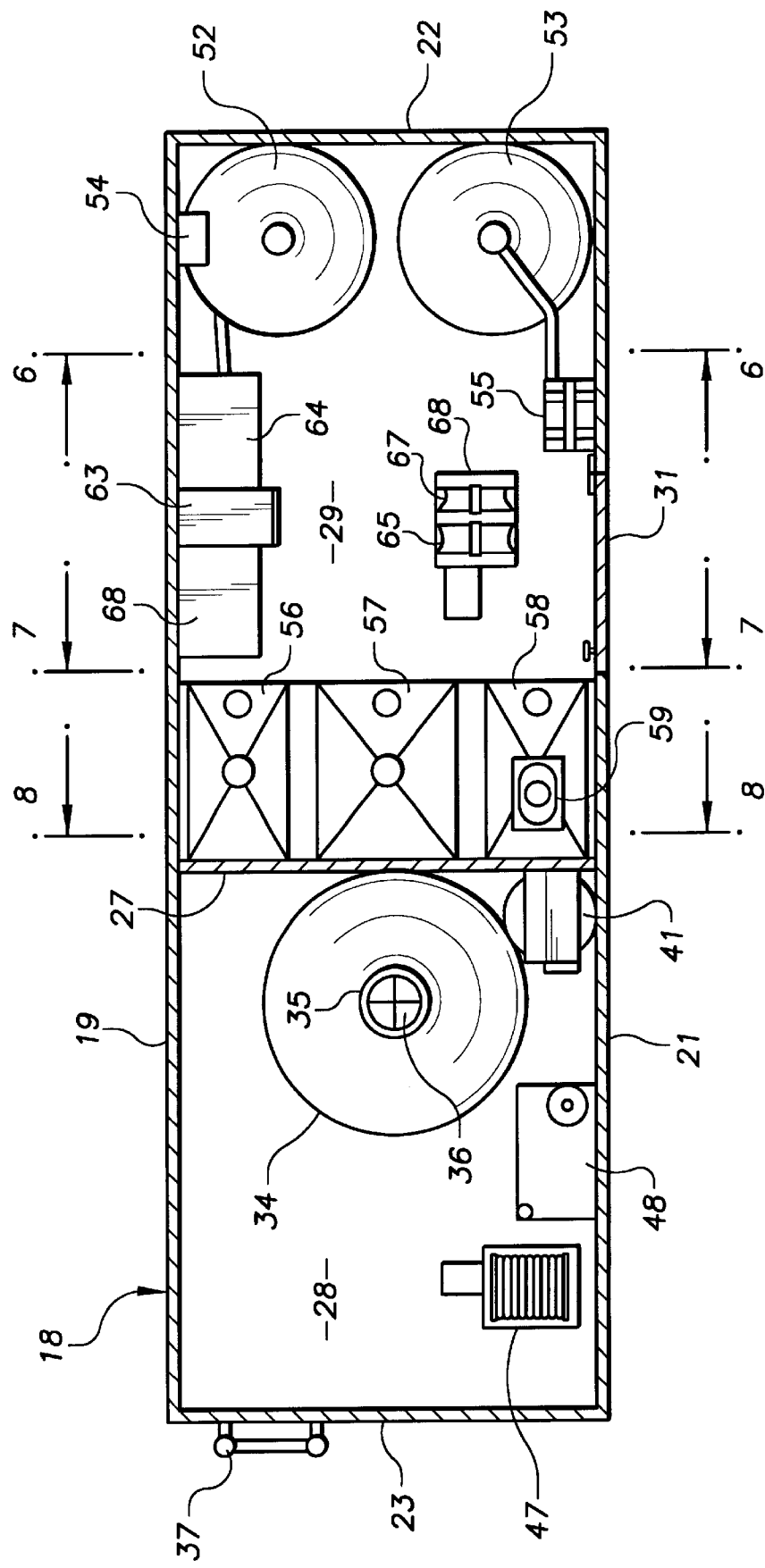
FIG. 5 is an enlarged sectional view taken along line 5—5 of FIG. 1.
Figure 8:
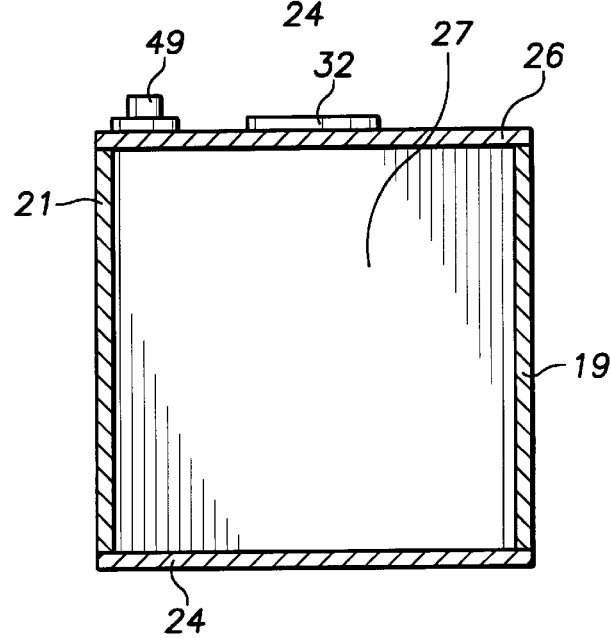
FIG. 8 is a sectional view taken along line 8—8 of FIG. 6.
Figure 9:
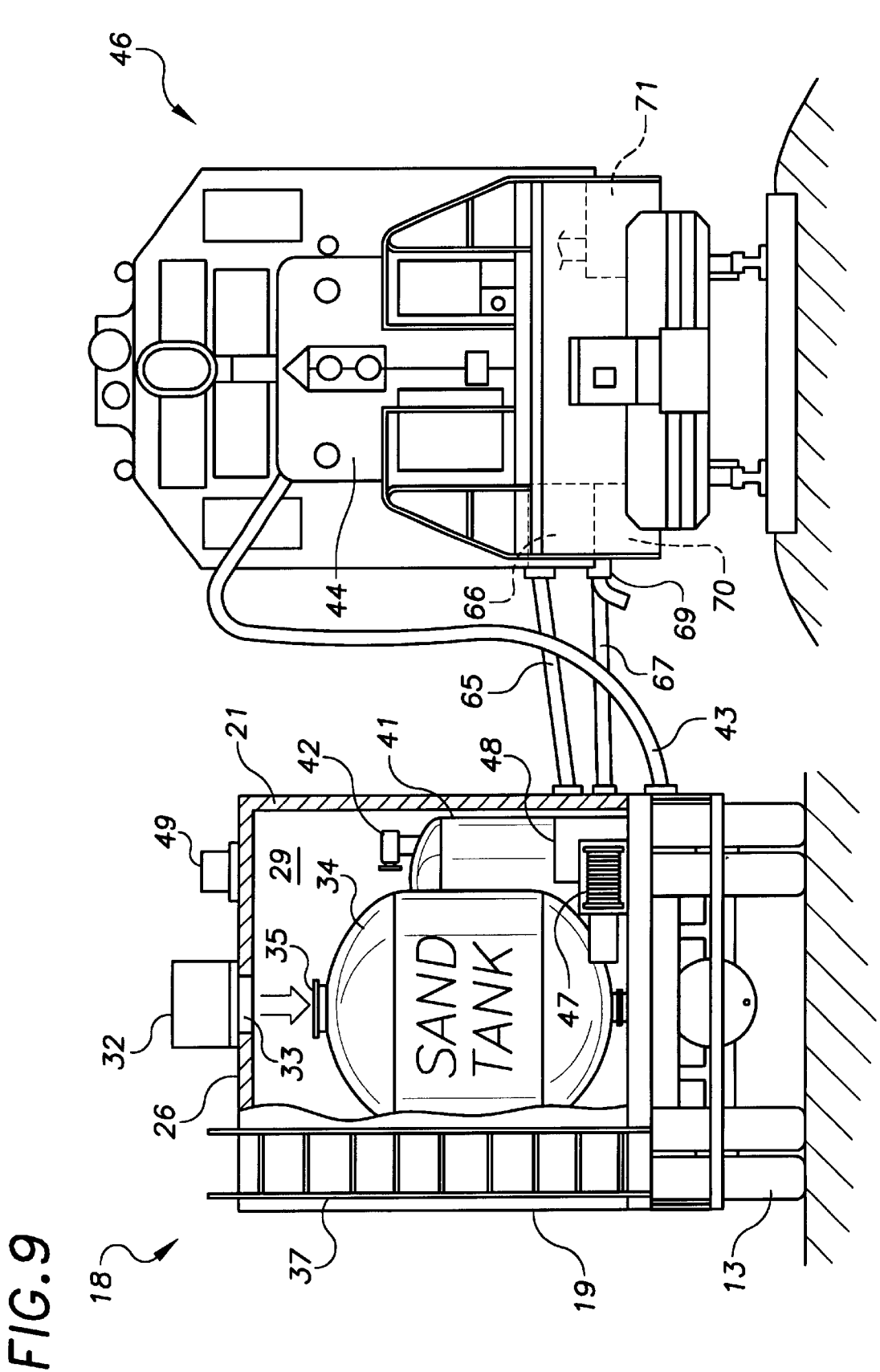
FIG. 9 is an end elevational view, partly sectioned, of the truck of FIG. 1 and a rail locomotive being serviced with water, oil and sand.

As shown in FIGS. 5 and 8, a transverse wall or partition 27 extended between side walls 19 and 21 divide the interior of housing 18 into two rooms or compartments 28 and 29. Side wall 21 has a door 31 operable to selectively open and close an entrance to compartment 28. End wall 23 can be provided with a door to allow a person to enter and exit from compartment 29. A sand tank access door 32 hinged to roof 26 closes an opening 33 located above a sand tank or container 34 in compartment 28. Tank 34 has top opening 35 aligned with opening 33 whereby a pipe or hose can be used to deliver sand to tank 34. A split member 36 extends across opening 35 to confine the sand to tank 34. A ladder 37 secured to rear end wall 23 allows a person to climb up to roof 26 to open and close door 32 and insert a sand carrying hose to tank opening 35 and through split member 36. Sand from a tank or other sand source flows through the hose to fill tank 34 with sand. The bottom of tank 34 has a sand outlet or tube 38 open to an air line 39 which is operatively coupled to an air compressor 41 having an air pump driven with an electric motor 42. The flowing air from air compressor 41 picks up sand from sand outlet 38 and carries sand to a hose 43 that delivers sand to a sand hopper 44 of a rail locomotive 46, as shown in FIG. 9. Hose 43 is stored on a large hose real 47 located in compartment 29. An electrical power supply, shown as an electric generator 48 located in compartment 29, operates to supply electric power to electric motor 42 of air compressor 41 and a clear strobe light 49. As shown in FIGS. 1 to 4, strobe light 49 is mounted on a rear corner of roof 26. Flood lights 51, shown in FIG. 1, are mounted on the rear of frame 11. Electric generator 48 also supplies electric power to flood lights 51 and electric motors that operate reel 47 and pumps that transfer water and oil to locomotive 46 as hereinafter described.

Figure 6:
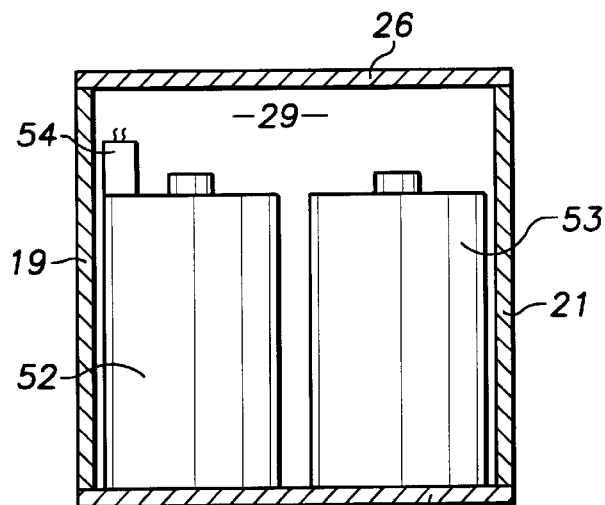
FIG. 6 is a sectional view taken along the line 6—6 of FIG. 5.
Figure 7:
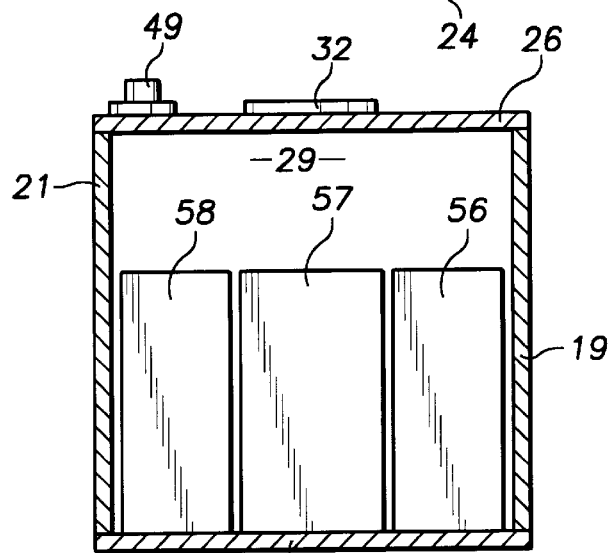
FIG. 7 is a sectional view taken along the line 7—7 of FIG. 5.

Returning to FIGS. 5, 6 and 7, a cylindrical water tank 52 and cylindrical used oil tank 53 are located in compartment 29 adjacent front wall 22. Water in tank 52 is prevented from freezing in cold eliminates with an electric heater 54. Other devices can be used to heat the water in tank 52. A used oil pump 55 in compartment 29 is operable to pump used oil from locomotive 46 into tank 53. Rectangular tanks 56, 57 and 58 located in compartment 29 adjacent wall 27 accommodate compressor oil and journal oil for locomotive 46 and sewage waste from locomotive 46. A sewer pump 59 on tank 58 is used to pump sewage waste from locomotive 46 into tank 46. A bottom tank 61, shown in FIG. 1, mounted on frame 11 below floor 24 accommodates engine oil. An LP gas tank 62 mounted on frame 11 is connected to an LP gas heater 63 located adjacent a water pump 64 operable to pump water from tank 52 to locomotive 46. Hoses 66 and 67 stored on a hose reel 68 are unwound from reel 68 and used to carry water and oil to locomotive 46. As shown in FIG. 9, hoses 66 and 67 connected to pumps 64 and oil pumps extended from box 18 to locomotive 46 transfer water from tank 52 and oil from tanks 56, 57 and 61 to the water and oil tanks on locomotive 46. An equipment and tool storage cabinet and shelves 68 is located adjacent heater 63. The controls for the pumps can be located on cabinet 68. Automatic shut-off controls are used to terminate the flow of oil or fuel to locomotive when the fuel bank of the locomotive to prevent fuel spillage into the environment. Oil spill clean-up chemicals stored in cabinet 68 are usable by work persons in the event fuel or oil is discharged into the environment to clean up the fuel or oil.

In use, the locomotive 46 is serviced with fuel, oil, water, and sand in a remote location to save time, labor, and cost. The truck 10 driven to the location of locomotive 46 has separate supplies of fuel, oil, water, and sand stored in tanks 56, 57, 61, and 34. As shown in FIG. 9, hose 67 extended between truck 10 and locomotive 46 transports fuel to locomotive fuel tank 70. Hose 65 is used to carry water from truck 10 to locomotive 46. Hoses 65 and 67 have sufficient lengths to traverse ditches and elevational grades. A pump operates to move the fuel through hose 67 and nozzle 69 into the locomotive fuel tank 70. Nozzle 69 has an automatic shut-off mechanism that stops the flow of fluid through nozzle 69 when the locomotive fuel tank 70 is full. Fuel is not allowed to spill onto roadway 12 or contaminate surrounding environment. The pump has a bypass valve that opens, in response to fuel pressure and returns the fuel back to tank 57. Other structures can be used to automatically terminate dispensing of fuel to locomotive 46 and shut down operation of the pump. Separate hoses extended from truck 10 to locomotive 46 carry oil and water from the oil and water tanks 56, 57, 61, and 52 to the oil and water tanks or diesel engine of locomotive 46. Separate pumps are individually operated to move the oil and water in the oil and water hoses.

The liquids and solid wastes from the holding tank 71 on the locomotive are transferred to tank 58. A flexible tube or hose connected to sewer pump 59 and the holding tank 71 transfers liquid and solid wastes from the holding tank 71 to tank 58.

Sand is moved from sand container 34 with air from air compressor 41. Air flowing in air line 39 draws sand through the outlet 38 on the bottom of container 34 into the flowing air stream. The moving air transports the sand through hose 43 and into the locomotive sand hopper 44. When sand hopper is full of sand, hose 43 is wound on its storage reel. When the servicing of locomotive 46 is completed, the water and oil hoses are returned to their storage reels. The truck 10 is returned to the service depot. Locomotive 46 is ready to continue pulling the train since it has not been cut from the train.

Modifications in the structure of the locomotive servicing truck and method can be made by a person skilled in the art without departing from the invention. The invention is defined in the following claims.

What is claimed is:

1. A vehicle for servicing a rail locomotive with oil, water, and sand and removing sewage waste from the locomotive, said locomotive having a first means for storing oil, a second means for storing water, a hopper for storing sand, and a third means for accommodating sewage waste, comprising: a motor truck having a frame, a housing mounted on the frame, said housing having a transverse wall dividing the inside of the housing into a first compartment and a second compartment, a container located in said first compartment for accommodating sand, means adapted to move sand from the container to the hopper on the locomotive, a first tank located in the second compartment for accommodating water, means adapted to move water from the first tank to the second means for storing water on the locomotive, a second tank located in the second compartment for accommodating oil, means adapted to move oil from the second tank to the first means for storing oil on the locomotive, a third tank located in said second compartment for storing sewage waste, and means adapted to move sewage waste from the third means on the locomotive into the third tank.

2. The vehicle of claim 1 wherein: the means adapted for moving sand from the container to the hopper includes an air compressor located in the first compartment for generating a supply of air under pressure, and means using said supply of air for moving sand from the container to the hopper.

3. The vehicle of claim 2 wherein: the means using said supply of air includes a hose for carrying air and sand to the hopper.

4. The vehicle of claim 2 including: an electric generator located in said first compartment operable to generate a supply of electric power, said air compressor having an electric motor operable with said electric power.

5. The vehicle of claim 1 wherein: the housing includes side walls, and a roof, a first door mounted on one side wall closing an opening providing access to the second compartment, and a second door mounted on the roof closing an opening providing access to the first compartment and container for accommodating sand.

6. The vehicle of claim 1 including: a tank for storing used oil in said second chamber.

7. The vehicle of claim 1 including: a heater located in said second compartment for supplying heat to the second chamber.

8. The vehicle of claim 1 including: a tank mounted on the frame for storing engine oil.

9. The vehicle of claim 1 wherein: the means adapted for moving water from the first tank includes a pump located in the second compartment.

10. The vehicle of claim 1 wherein: said container having a sand inlet opening, said housing having a roof, an opening in said roof aligned with said inlet opening, and a door mounted on the roof for closing said opening.

11. A vehicle for servicing a rail locomotive with oil, water, and sand and removing sewage waste from the locomotive, said locomotive having a first means for storing oil, a second means for storing water, a hopper for storing sand, and a third means for accommodating sewage waste, comprising: a vehicle, having a housing, said housing having upright walls, a roof, and an internal partition between said side walls separating the housing into first and second internal compartments, a container located in said first compartment for storing sand, means adapted to move sand from the container to the hopper, a first tank located in said second compartment for storing water, means adapted to move water from the first tank to the second means for storing water on the locomotive, a second tank on the second compartment for storing oil, means adapted to move oil from the second tank to the first means for storing oil on the locomotive, a third tank located in said second compartment for storage sewage waste, and means adapted to move sewage waste from the locomotive to the third tank.

12. The vehicle of claim 11 wherein: the means adapted for moving sand from the container to the hopper includes an air compressor located in the first compartment for generating a supply of air under pressure, and means using said supply of air for moving sand from the container to the hopper.

13. The vehicle of claim 12 wherein: the means using said supply of air includes a hose for carrying air and sand to the hopper.

14. The vehicle of claim 12 including: an electric generator located in said first compartment operable to generate a supply of electric power, said air compressor having an electric motor operable with said electric power.

15. The vehicle of claim 11 including: an opening in the roof, and a door mounted on the roof for closing said roof, said door being movable to an open position to allow sand to be deposited into said container.

16. The vehicle of claim 11 including: a tank for storing used oil in said second chamber.

17. The vehicle of claim 11 including: a heater located in said second compartment for supplying heat to the second chamber.

18. The vehicle of claim 11 including: a tank mounted on the frame for storing engine oil.

19. The vehicle of claim 11 wherein: the means adapted for moving water from the first tank includes a pump located in the second compartment.

20. The vehicle of claim 11 wherein: said container having a sand inlet opening, said housing having a roof, an opening in said roof aligned with said inlet opening, and a door mounted on the roof for closing said opening.

* * * * *